Aug. 22, 1950   H. A. EARNEST   2,519,828
LOCKING MEANS FOR SPEEDOMETER DRIVE SHAFTS
Filed Aug. 15, 1946
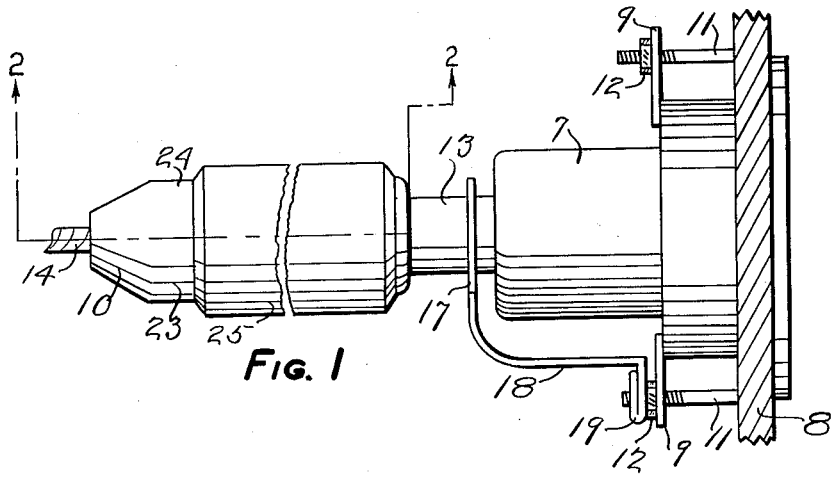
FIG. 1
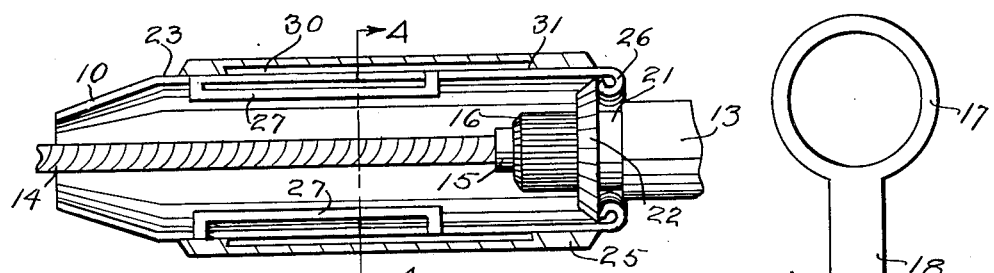
FIG. 2
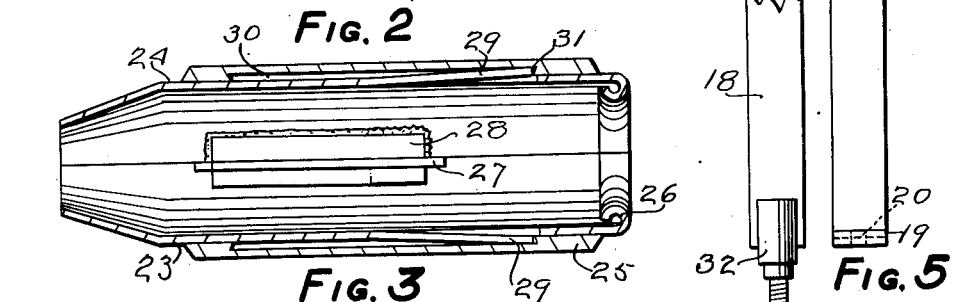
FIG. 3
FIG. 5
FIG. 6
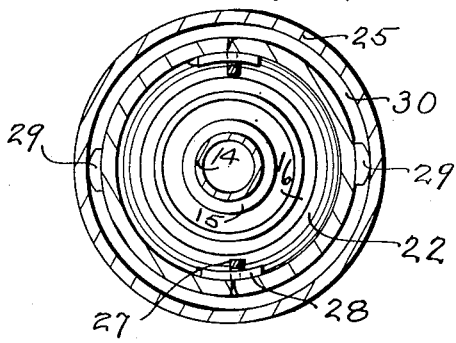
FIG. 4
HARRY A. EARNEST
Inventor
By Mason, Porter, Miller
& Stewart Attorneys Patented Aug. 22, 1950

2,519,828

UNITED STATES PATENT OFFICE 2,519,828

LOCKING MEANS FOR SPEEDOMETER DRIVE SHAFTS

Harry A. Earnest, St. Petersburg, Fla., assignor to G. C. Lythgoe, Detroit, Mich.

Application August 15, 1946, Serial No. 690,634

2 Claims. (Cl. 64—3)

1

The following specification relates to my invention in improvements in locking means for speedometer drive shafts and the like. It is particularly adapted for securing a speedometer and its operating mechanism against unauthorized maladjustment or tampering. Many occasions arise when it is desired to rely upon a speedometer to record accurately and beyond question the true distance traveled. There are times when the motor vehicle is entrustd to a driver with the responsibility for strict accounting for the distance traveled. There is a strong temptation for one in charge of the vehicle to disconnect the speedometer from the transmission gear so that the record of the speedometer will be less than the actual mileage traveled. Such disconnection also offers the opportunity for the operator to alter the reading of the speedometer to suit his own ends.

In the patents granted to me on January 12, 1932, Nos. 1,841,318 and 1,841,319, I have disclosed and claimed devices precluding the disconnection of the speedometer from the flexible drive shaft.

The present invention is an improvement over the devices thus disclosed.

One of the objects of my invention is to devise a locking means which may be more readily assembled on the coupling of the flexible drive shaft with the speedometer structure.

Another object of my invention is to provide interchangeable and replaceable parts for use in effectively locking the drive shaft to the speedometer.

A still further object of my invention is to provide a locking means in which the operating features are hidden from view and not accessible for unlocking purposes.

A still further object of my invention is to provide securing means which will prevent removal of the speedometer from its mounting and thus prevent unauthorized change or alteration.

These and other objects of my invention will be clearly apparent from the following description of the preferred form of my invention as illustrated on the accompanying drawings. In the drawings;

Fig. 1 is a side elevation of the improved locking means as applied to a typical speedometer mounting;

Fig. 2 is an enlarged horizontal axial section taken on the line 2—2 of Fig. 1;

Fig. 3 is an enlarged vertical axial section of the locking means;

2

Fig. 4 is an enlarged transverse section taken on the line 4—4 of Fig. 2;

Fig. 5 is a plan view of the speedometer securing means; and

Fig. 6 is a fragmentary plan view of a modified form of the securing means.

The device disclosed in the following description forms a locking means in several parts easily assembled on the coupling between the flexible drive shaft and the sleeve of a speedometer housing. It offers protection against unauthorized uncoupling or removal of the speedometer from its mounting incidental to such attempts. In general, the device includes an attaching ring which seals the speedometer housing against removal from its mounting as long as the speedometer remains coupled to the flexible drive shaft. Also included is a locking means for the coupling which gives no outward hint of the manner in which it may be opened or disassembled. It also successfully shields the customary coupling nut so that it cannot be reached for manipulation or loosening.

I have shown a speedometer 7 which is adapted to be mounted on an instrument panel 8 in the usual manner. This includes a collar or ears 9 extending outwardly from the speedometer housing and held on bolts 11 forming permanent parts of the instrument panel 8. Nuts 12 are the usual ones which hold the speedometer in its mounting firmly against the panel 8. The speedometer housing has the usual rear tubular extension 13 internally screw threaded to receive the flexible sleeve 14 of a drive shaft. This drive shaft has a terminal fixture 15 around which is loosely carried a coupling nut 16. This coupling nut forms a union with the fixture 15 and cannot be removed therefrom.

The usual practice is to tighten the coupling nut 16 in the tubular extension 13, thus connecting the flexible drive shaft inside of sleeve 14 with the rotating parts of the speedometer. I have provided a securing means in the form of a metallic ring 17, in order to prevent separation of the speedometer from the panel 8 incidental to unauthorized altering of the reading of the speedometer or disconnecting it from the vehicle transmission. This fits over the extension 13 as shown in Fig. 1 before sleeve 14 is attached but after being bolted to the instrument panel or other part of the vehicle. The ring 17 is attached to one end of a metallic strip 18. This strip is flexible and has the opposite end, 19, bent. The bent end 19 has an internally screwthreaded opening 20. This is adapted to thread on the bolt 11 in the manner shown in Fig. 1 before the ring 17 is slipped over the extension 13.

It will be clearly apparent that in order to thread the end 19 on the bolt 11, the securing means must be clear of the extension 13. After the end 19 has been screwed down against nut 12, ring 17 may be slipped over the extension 13. Thereafter, the strap 18 may not be loosened or removed so long as the sleeve 14 of the drive shaft is connected with the extension 13.

In order to adapt the coupling to hold a locking means, I have provided a retaining ring 21. This has a circumferential sliding fit over the reduced screw threaded portion of the coupling nut 16. It also has a flange 22 which forms an abutment for the locking means proper.

The locking means proper is formed of two split collar sections 23, 24 and an interlocking, slidable sleeve 25.

The collar sections are split longitudinally and fit together to form a complete cylindrical collar. One end of each section is curled inwardly as shown at 26 and fits back of the flange 22 of the retaining ring to prevent the collar from being removed from over the ring.

The opposite end 10 of the collar section is tapered to fit loosely around the flexible sleeve 14.

Collar section 23 has bails 27, 27 on opposite side edges. These bails are bent inwardly as shown in Fig. 2 if integral with the material of the section. However, they may also be separate pieces attached by means of soldering.

The other collar section 24 has a pair of opposed ears 28, 28. These ears may be integral with the section 24 and inwardly offset from the main portion, or as indicated in Fig. 3, they may be in the form of small plates soldered in position along the longitudinal edges of the section. In like manner each section 23, 24 may have both a bail 27 and an ear 28. Thus the sections would be both interlocking and interchangeable.

Each section 23, 24 has one or more spring tongues 29. These tongues are struck up from the metal of which the sections are formed and project outwardly therefrom.

The sleeve 25 is cylindrical and fits snugly but slidably over the sections 23 and 24 when the latter are assembled with the ears 28 in the bails 27. The sleeve has an inner recess or groove 30. The front edge of this recess has an acute angled edge 31. As indicated in Fig. 3, the resilient tongues 29 fit within the recess 30 and into the angle 31 to prevent sliding movement of sleeve 25 over the sections 23 and 24.

In assembling this lock, the sleeve 25 is slipped over the flexible sleeve 14 before the latter is coupled to the extension 13 and within the retaining ring 21. The collar sections 23 and 24 are fitted together with the ears 28, 28 inserted in the bails 27, 27. The collar sections then form a cylindrical shell around the coupling with the bead 26 held by the flange 22.

Sleeve 25 may be slipped over the tapering end of the split collar and along the cylindrical surface until the resilient tongues 29 are first compressed and subsequently received in the groove 30 against the angle 31.

It will then be impossible to remove the sleeve 25 without cutting it apart. Hence, the ears 28 cannot be removed from the bails 27. As a consequence, the coupling remains tight. It is also clear that this arrangement prevents removal of the ring 17 and removal and alteration of the speedometer itself.

When the bolt 11 is removable and passes through the ear 9 for fastening the latter to the panel 8, I substitute a fastening such as is shown in Fig. 6. Here the strip 18 ends in a screw-threaded rod 32. This is attached before the ring 17 is slipped over 13. Removal of the speedometer without disconnecting the flexible drive is accordingly precluded.

The above description is of the preferred form of my invention without, however, limiting it in respect to proportions, material or structural details within the scope of the appended claims.

What I claim is:

1. Locking means for the coupling nuts of flexible drive shafts comprising a retaining ring loosely carried by the shaft coupling nut, a split collar having two or more sections, a bead formed on the sections to fit over the retaining ring, a pair of inwardly directed bails on the longitudinal edges of one section, cooperating ears on the longitudinal edges of the second section, a recessed sleeve slidable over the sections and resilient latching means extending outwardly from the sections for locking the sleeve against reverse sliding movement.

2. Locking means for the coupling nuts of flexible drive shafts comprising a retaining ring loosely carried by the shaft coupling nut, a split collar having two or more sections, a bead formed on the sections to fit over the retaining ring, a pair of inwardly directed bails on the longitudinal edges of one section, cooperating ears on the longitudinal edges of the second section, a recessed sleeve slidable over the sections and outwardly directed resilient tongues on each section for locking the sleeve against reverse sliding movement.

HARRY A. EARNEST.

REFERENCES CITED

The following references are of record in the file of this patent:

UNITED STATES PATENTS

| Number | Name | Date |
| --- | --- | --- |
| 1,039,342 | Wheelock | Sept. 24, 1912 |
| 1,387,177 | Reddig | Aug. 9, 1921 |
| 1,841,319 | Earnest | Jan. 12, 1932 |